US011739812B1

(12) United States Patent
Petersen et al.

(10) Patent No.: US 11,739,812 B1
(45) Date of Patent: Aug. 29, 2023

(54) HIGH STRENGTH SINGLE SCREW ROPE TERMINATOR CONNECTOR

(71) Applicant: The National Telephone Supply Company, Cleveland, OH (US)

(72) Inventors: Carl C. Petersen, Mentor, OH (US); Raymond Disantis, Willoughby Hills, OH (US)

(73) Assignee: The National Telephone Supply Company, Cleveland, OH (US)

( * ) Notice: Subject to any disclaimer, the term of this patent is extended or adjusted under 35 U.S.C. 154(b) by 18 days.

(21) Appl. No.: 17/466,584

(22) Filed: Sep. 3, 2021

Related U.S. Application Data (63) Continuation-in-part of application No. 16/502,618, filed on Jul. 3, 2019, now Pat. No. 11,111,627.

(60) Provisional application No. 62/695,527, filed on Jul. 9, 2018.

(51) Int. Cl.
*F16G 11/00* (2006.01)
*F16G 11/14* (2006.01)
*F16G 11/06* (2006.01)

(52) U.S. Cl.
CPC ............... *F16G 11/14* (2013.01); *F16G 11/06* (2013.01); *Y10T 24/3967* (2015.01)

(58) Field of Classification Search
CPC ...... F16G 11/06; F16G 11/14; Y10T 24/3958; Y10T 24/3969; Y10T 24/3973; Y10T 24/3978; Y10T 24/3967
See application file for complete search history.

(56) References Cited

U.S. PATENT DOCUMENTS

| | | |
|---|---|---|
| 306,078 A | 10/1884 | Hubner |
| 312,580 A | 2/1885 | O'Malley |
| 2,043,512 A | 6/1936 | Hoover |
| 3,268,965 A | 8/1966 | Arthur |
| 4,342,477 A | 8/1982 | McClure |
| 4,623,338 A | 11/1986 | Larson |
| 5,967,151 A | 10/1999 | Villani et al. |
| 5,984,380 A | 11/1999 | Rice |
| 7,204,107 B2 | 4/2007 | Leyden et al. |
| 7,624,479 B1 | 12/2009 | Lin |

*Primary Examiner* — Robert Sandy
*Assistant Examiner* — Michael S Lee
(74) *Attorney, Agent, or Firm* — Lippes Mathias LLP (57) ABSTRACT

A cable terminator connector includes a screw and base having a first opening and a second opening. The first and second openings are configured to receive first and second cable portions wherein the screw is threaded into the base thereby pushing the first and second cable portions into the first and second openings and clamping the first and second cables portions into the base.

3 Claims, 6 Drawing Sheets

HIGH STRENGTH SINGLE SCREW ROPE TERMINATOR CONNECTOR

CLAIM OF PRIORITY

This continuation-in-part application claims priority to U.S. patent application Ser. No. 16/502,618, filed on Jul. 3, 2019, which will issue as U.S. Pat. No. 11,111,627 on Sep. 7, 2021, which claims priority to U.S. Provisional Patent Application Ser. No. 62/695,527, filed on Jul. 9, 2018, the entirety of which is hereby incorporated by reference.

BACKGROUND OF THE DISCLOSURE

There are many types of termination devices to terminate the end of a rope, and to connect two ends of rope together. A common method of terminating the end of a single wire rope is an "eye-splice" which is a loop formed at the end of the rope and the end fixed back onto the rope by several means such as compression sleeves and bolted clamps. To connect two ends of a rope together, one common method is referred to as a "lap-slice" which clamps two over-lapping ends of the connecting ropes. A current solution for both types of terminations is a compressible metal sleeve which has the ability to form permanent and full-strength solutions, which will typically grip the rope at a force equal to the breaking force of the rope.

Other methods of terminating and connecting ropes include: "potting" the end of the cable into a device with a retention eye, and; clamping devices which typically use threaded fasteners to secure the end of the rope. Potted terminations require the end of the cable to be inserted into the socket of the termination device, then pouring a potting solution of molten metal or liquid polymeric compounds which harden upon curing. The compressed sleeve and potting solutions are considered permanent and not serviceable (or non-adjustable) once the terminations have been installed.

One common type of serviceable connection is the "Crosby" style clamp connector utilizing a "U-shaped" section threaded on each end with nuts to fasten the "saddle" portion of the connector during installation. This type of termination is widely used in industrial and household applications since they are widely adaptable, have the ability to be installed with common tools; and can be adjusted or removed after installation.

The most typical problems with these types of connectors are: difficulty and length of time to install; the terminations typically require the use of three connectors per termination; and lower cable grip strength is achieved when properly installed (approximately 80% of the rated breaking strength (RBS) of the cable being terminated).

Thus, there is a need for bolted connectors offering improved grip performance and ease of installation to serve as an alternative to the "Crosby" style wire rope clamps, compression sleeves; and other termination devices, which overcomes the above-mentioned deficiencies and other while providing better overall results.

SUMMARY OF THE DISCLOSURE

The cable termination concepts of the present disclosure are serviceable types of connectors which are unique to the current methodology of compressing a sleeve to form a permanent termination. These conceptual and prototyped devices have been shown to provide: easier installation method; require only one connector per termination and offer higher grip strength (90-100% RBS).

In accordance with a first embodiment of the disclosure, a screw and a base housing has open slots to receive cables. A threaded portion of the screw is smaller and located ahead of a taper and passes between parallel paths of the cable. As it is tightened into the housing into threads of the housing, the screw pushes the cables into the circular pockets and clamps them to the housing. This configuration allows the cables to be easily installed into the slots of the base before the screw is installed.

In accordance with a second embodiment of the disclosure, a screw and a base housing has through-ports to receive cables. A threaded portion of the screw is larger in diameter and is located behind tapered section of the screw. The cables are inserted through the ports of the base housing and the screw is installed. The taper portion of the screw first passes between parallel paths of the cable, then it is tightened into the base housing, pushing the cables into the circular pockets and clamping them to the housing. The configuration enables a larger screw to be utilized and an enclosed circular pocket within the housing thus provides a stronger clamping force onto the cable, however, installing cables through the ports of the base requires more effort than laying cables into slots as in the first embodiment.

In accordance with a third embodiment of the disclosure, provided is a screw and a base housing having slots and oblong slots to receive and retain cables, from the bottom portion of the base. A threaded portion of the screw is larger in diameter and is located behind a tapered section of the screw. During installation, one cable passes into the furthest vertical extremity of the slot temporarily while the second cable passes by the first into its horizontal position. The first cable then drops into its horizontal position in lower portion of slot while the screw is inserted into the base. The taper portion of the screw first passes between the parallel paths, of the cables, then as it is tightened into the housing threaded section, pushes the cables into the circular pockets and clamps them to the housing. This configuration enables a larger screw to be utilized thus provides a stronger clamping force onto the cables and provides easier installation of the cables with the slots provided.

In accordance with another embodiment of the disclosure, a cable terminator connector, includes a screw and a base having a housing with a first opening and a second opening. The first and second openings receive first and second cable portions wherein the screw is threaded into the housing thereby pushing the first and second cable portions into the first and second openings and clamping the first and second cables portions into the housing.

In accordance with still another embodiment of the disclosure, a method of terminating a cable includes providing a screw and a base having a first opening and a second opening wherein the first and second openings receive first and second cable portions. The screw is threaded into the base thereby pushing the first and second cable portions into the first and second openings and clamping the first and second cable portions into the housing.

In accordance with another embodiment of the disclosure, a cable terminator connector has a screw including a threaded portion and an unthreaded portion, wherein the threaded portion diameter is greater than a diameter of the unthreaded portion. A base has a housing with a recessed portion forming a first opening and a second opening, wherein the first and second openings are configured to receive first and second cable portions. When the screw is threaded into the housing the first and second cable portions are pushed into pockets formed on sidewalls of the housing by the unthreaded portion of the screw thereby clamping the first and second cables portions into the housing. The screw has a head and an unthreaded portion has a tapered portion. The threaded portion of the screw extends between the head and the tapered portion. The base has a threaded portion positioned adjacent the first and second openings. The base threaded portion diameter is greater than an outer diameter of the base recess portion first and second openings. The base first and second openings each have a pair of openings formed on opposite side walls of the base.

Still other aspects of the disclosure will become apparent upon a reading and understanding of the following detailed description.

DETAILED DESCRIPTION OF THE DISCLOSURE

In accordance with the present disclosure, there are three preferred embodiments of the disclosure, all of which utilize twin tracks of cable clamping on a circular path, one screw, and a tapered section of the screw which displaces the cable into circular pockets where they become clamped.

Referring now to FIGS. 1-4, in accordance with a first embodiment of the disclosure, provided is a screw 10 and a base housing 12 with open slots 14, 15 therein to receive cables. A lower threaded portion 16 of the screw is smaller and located ahead of a taper 18 which is positioned between portion 16 and screw head 19 and passes between parallel paths of the cable formed by slots 14, 15.

Figure 1:
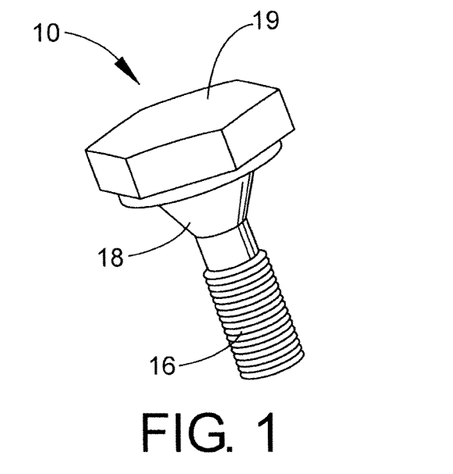
FIG. 1 is a perspective view of a screw for a screw and base assembly in accordance with a first embodiment of the disclosure.
Figure 2A:
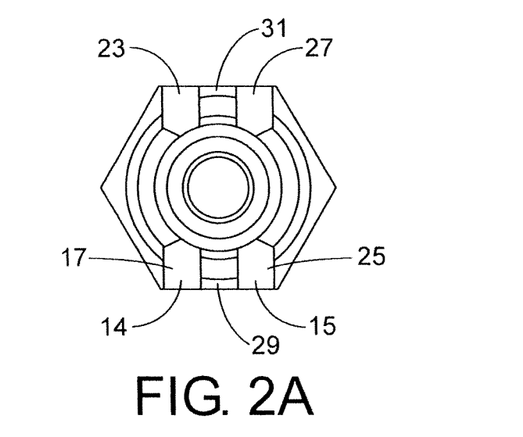
FIG. 2A is a top plan view of a base for a screw and base assembly in accordance with a first embodiment of the disclosure.
Figure 2B:
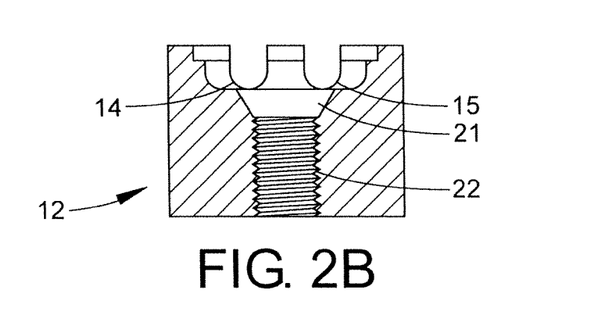
FIG. 2B is a side elevational view in cross section of the base of the screw and base assembly of FIG. 2A.

Referring to FIG. 2A, slots 14, 15 are formed by sets of slots 17, 23 and 25, 27 which are formed in opposite walls 29, 31 of the housing. Slots 17 and 23 align with each other and slots 25, 27 align with each other. Slots 17 and 23 are preferably parallel to slots 25, 27.

Figure 3:
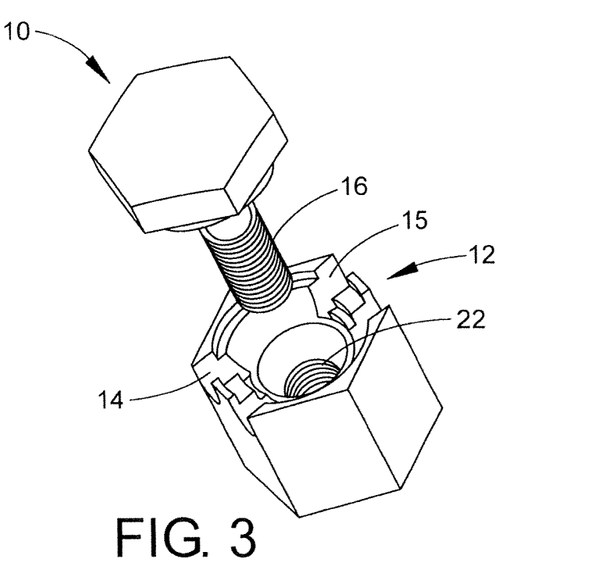
FIG. 3 is a perspective view of the screw of FIG. 1 and base of FIGS. 2A and 2B during assembly.
Figure 4:
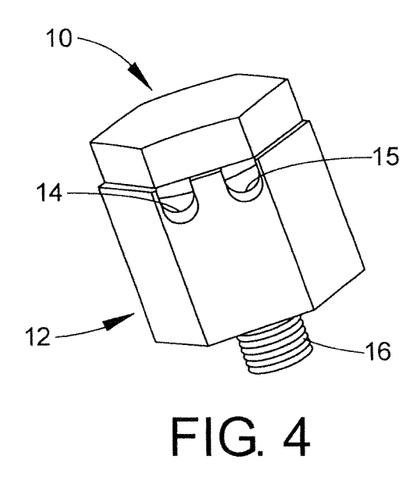
FIG. 4 is a perspective view of an assembled screw and base assembly in accordance with the first embodiment of the disclosure.
Figure 5:
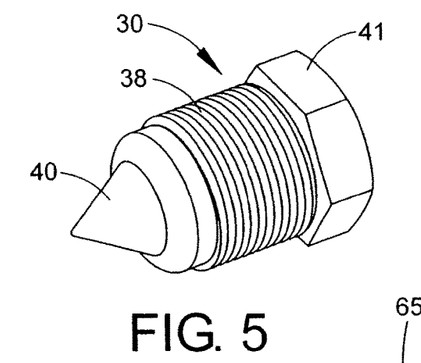
FIG. 5 is a perspective view of a screw of a screw and base assembly of a second embodiment of the disclosure.

Referring to FIG. 3, as the screw is inserted and tightened into the housing the screw threaded portion 16 threads into threads 22 of the housing and tapered portion 18 engages tapered portion 21 of the housing, the screw pushes the cables (not shown) into the circular pockets formed by slots 14, 15 and clamps them to the housing. This configuration allows the cables to be easily installed into the slots of the base before the screw is installed.

Referring now to FIGS. 5-7C, a second embodiment of the disclosure includes a screw 30 and a base 32 having a housing with through-ports 34, 35 therein to receive cable 36. A threaded portion 38 of the screw is larger in diameter and is located behind tapered section 40 of the screw and between head 41 of the screw and portion 40.

Figure 6A:
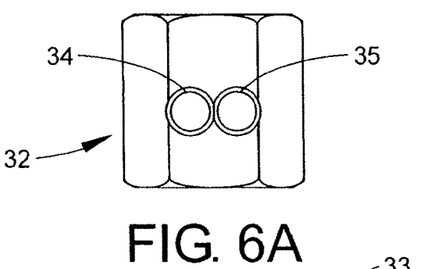
FIG. 6A is a side elevational view of a base of the screw and base assembly in accordance with a second embodiment of the disclosure.
Figure 6B:
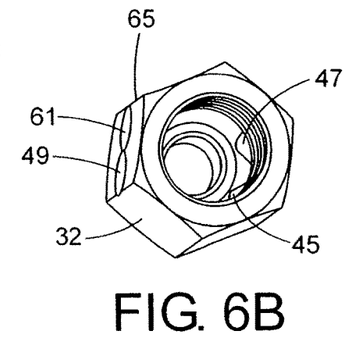
FIG. 6B is a perspective view of the base of FIG. 6A
Figure 6C:
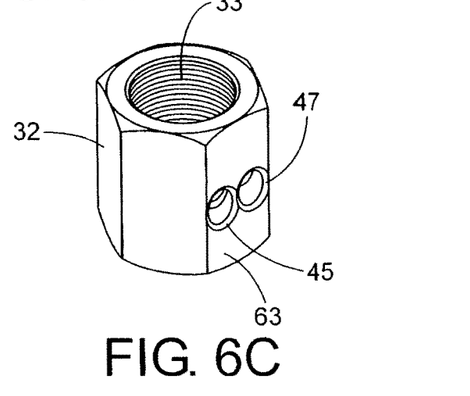
FIG. 6C is another perspective view of the base of FIG. 6A.

The cables 36 are inserted through the parallel ports 34, 35 of the base housing 32 and the screw 30 is installed. Port 34 includes a pair of openings 45, 49 aligned with each other and formed on opposite walls 63, 65 of base 32. Port 35 has a pair of openings 47, 61 aligned with each other and on opposite walls 63, 65. Openings 45, 49 are preferably parallel with openings 47, 61.

Figure 7A:
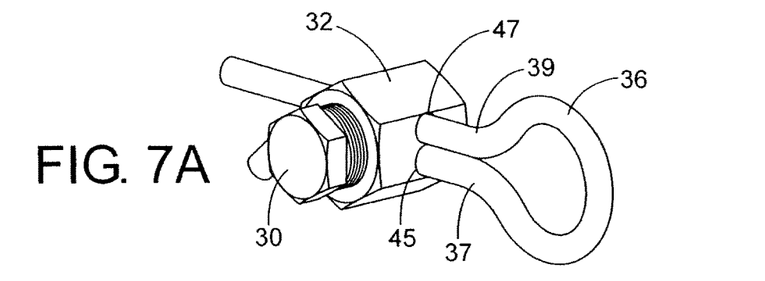
FIG. 7A is a perspective view of the assembled screw and base assembly of the second embodiment of the disclosure.
Figure 7B:
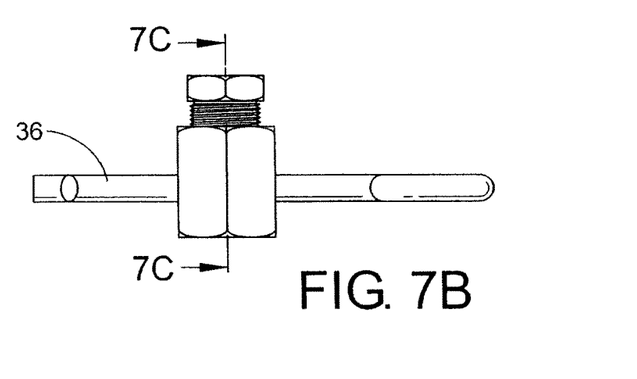
FIG. 7B is a side elevational view of the screw of FIG. 7A.
Figure 7C:
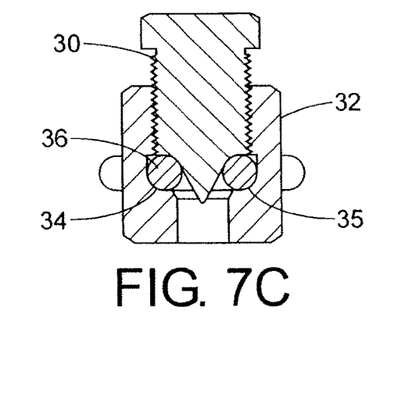
FIG. 7C is a side elevated view in cross section of the screw and base assembly along lines 7C-7C of FIG. 7B.
Figure 8A:
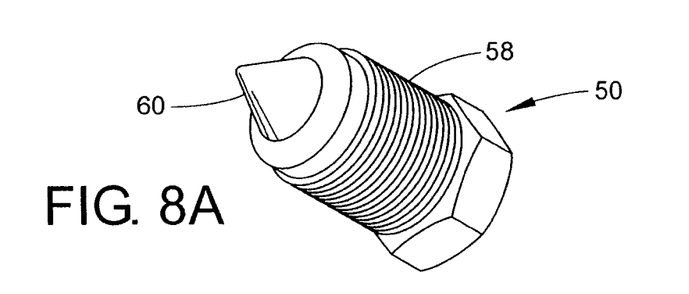
FIG. 8A is a perspective view of a screw for a screw and base assembly in accordance with a third embodiment of this disclosure.
Figure 8B:
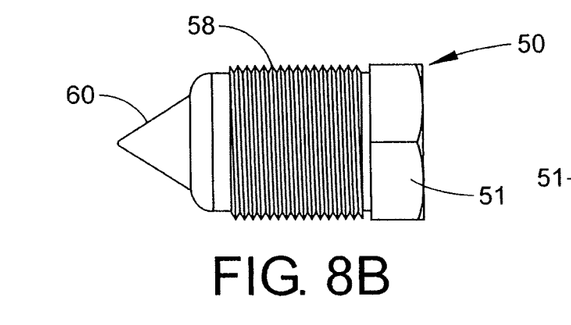
FIG. 8B is a side elevational view of the screw of FIG. 8A.
Figure 8C:
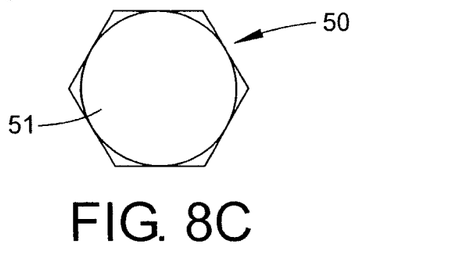
FIG. 8C is a top plan view of the screw of FIG. 8A.
Figure 9A:
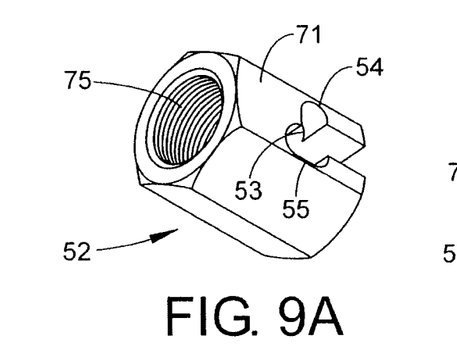
FIG. 9A is a perspective view of the base of the screw and base assembly according to the third embodiment of the disclosure.
Figure 9B:
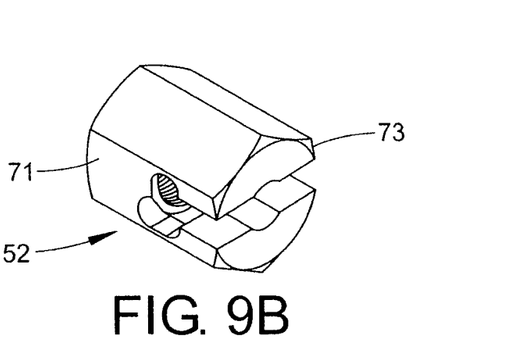
FIG. 9B is another perspective view of the base assembly of FIG. 9A.
Figures 9C, 9D:
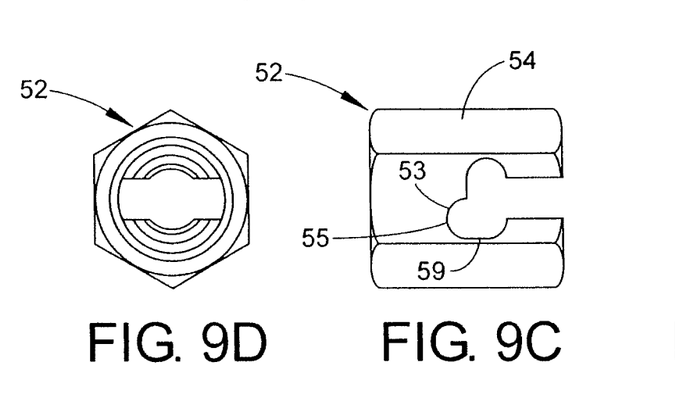
FIG. 9C is a side elevational view of the base of FIG. 9B.
FIG. 9D is a top plan view of the base of FIG. 9A.
Figure 9E:
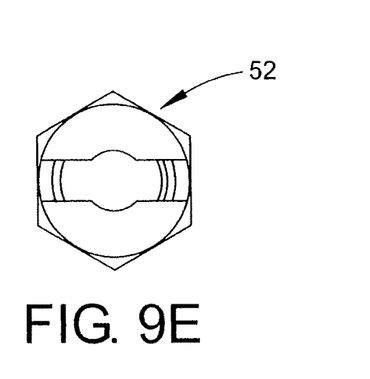
FIG. 9E is a bottom plan view of the base of FIG. 9A.
Figure 10A:
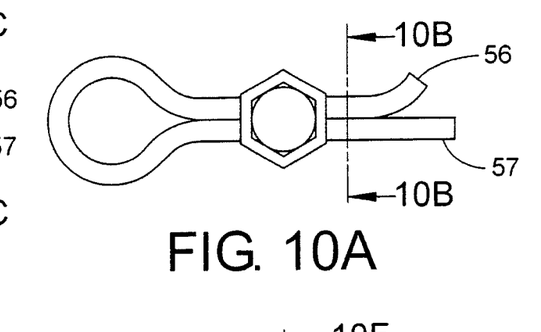
FIG. 10A is a top plan view of the assembled screw of base assembly of the third embodiment of the disclosure.
Figure 10B:
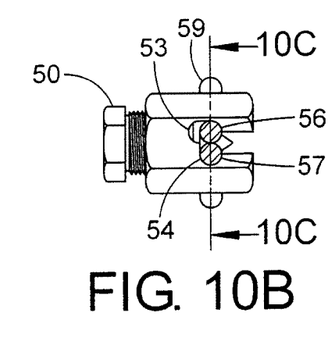
FIG. 10B is a side elevational view taken along lines 10B-10B of FIG. 10A.
Figure 10C:
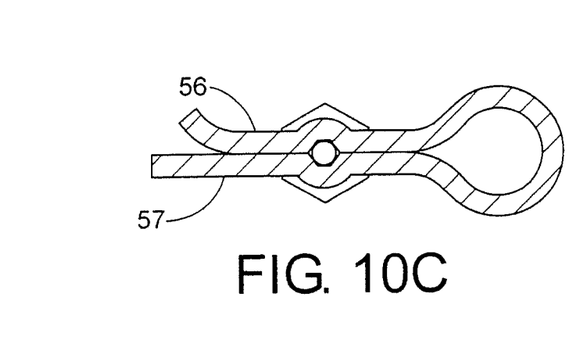
FIG. 10C is a side elevational view in cross section along lines 10C-10C of FIG. 10B.
Figure 10D:
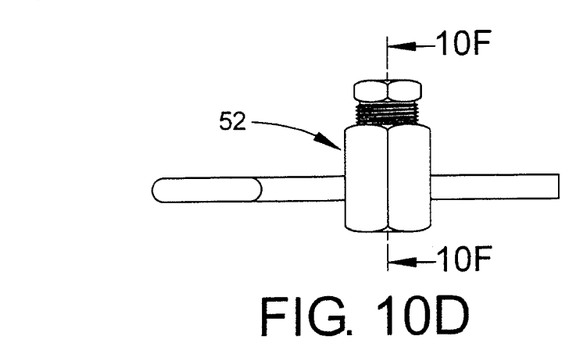
FIG. 10D is a side elevational view of the screw and base assembly of the third embodiment of the disclosure.
Figure 10E:
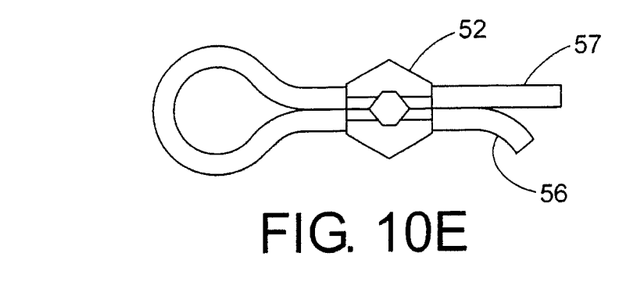
FIG. 10E is a bottom plan view of the assembly of FIG. 10D.
Figure 10F:
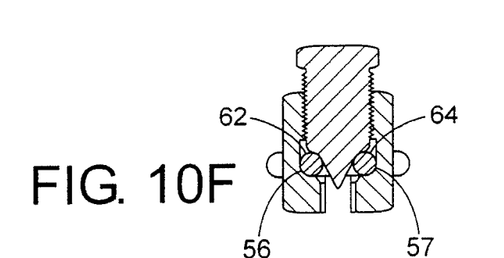
FIG. 10F is a side elevational view in cross section along lines 10F-10F of FIG. 10D.
Figure 10G:
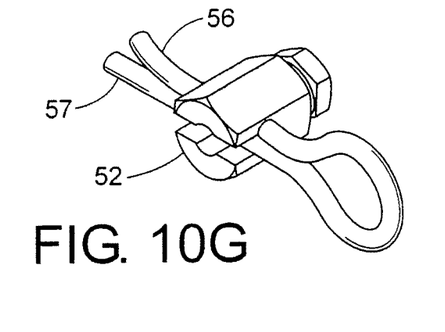
FIG. 10G is a perspective view of the assembly of FIG. 10D.
Figure 11A:
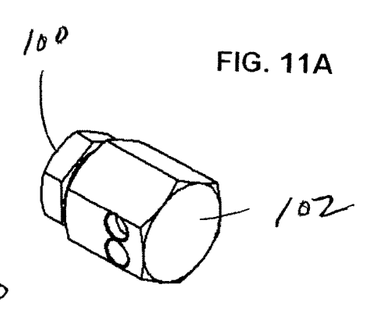
FIG. 11A is a perspective view of a base and screw assembly in an assembled configuration in accordance with another embodiment of the disclosure.
Figure 11B:
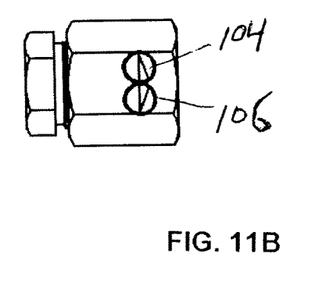
FIG. 11B is a side elevational view of the base and screw assembly of FIG. 11A.
Figure 11C:
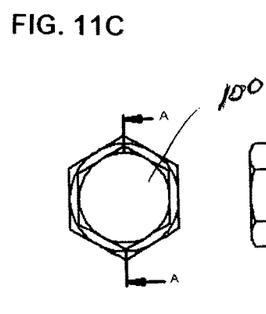
FIG. 11C is a top plan view of the base and screw assembly of FIG. 11A.
Figure 11D:
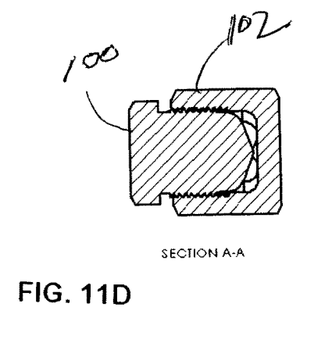
FIG. 11D is a cross-sectional side elevational view along line A-A of FIG. 11C.
Figures 12A, 12B, 12C, 12D, 12E:
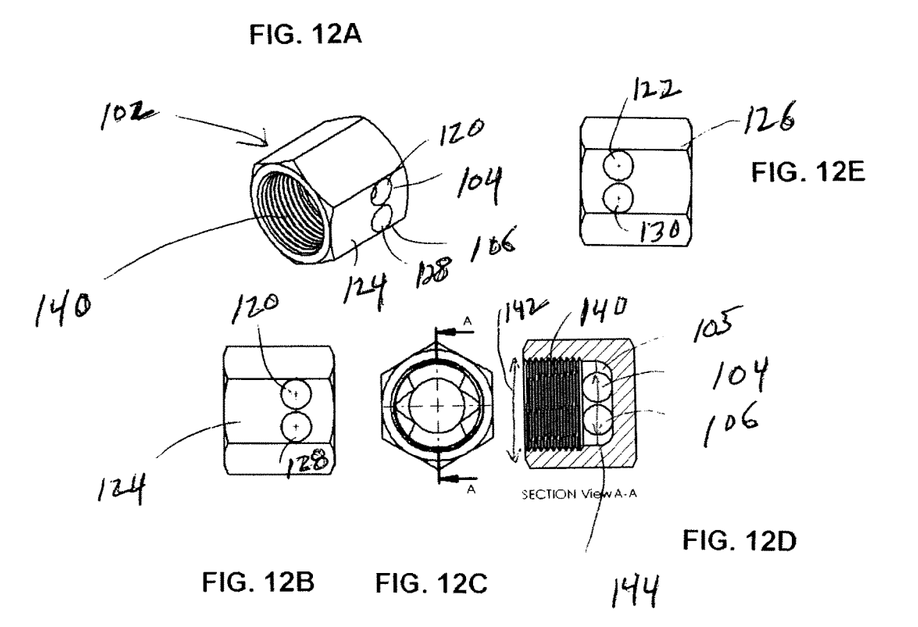
FIG. 12A is a perspective view of a base of the base and screw assembly of FIG. 11A in accordance with the disclosure.
FIG. 12B is a side elevational view of the base of FIG. 12A.
FIG. 12C is a top plan view of the base of FIG. 12A.
FIG. 12D is a cross sectional view of the base along line A-A of FIG. 12C.
FIG. 12E is a side elevational view of an opposite side of the base to FIG. 12B.

The taper portion 40 of the screw first passes between parallel paths of the cable formed by ports 34, 35, then it is tightened into the base housing 32, pushing the portions 37, 39 of cable 36 into the circular pockets formed by ports 34, 35 and clamping them to the housing 32 (see FIGS. 7A-7C).

This configuration enables a larger screw to be utilized and an enclosed circular pocket within the housing thus provides a stronger clamping force onto the cable.

In accordance with a third embodiment of the disclosure, referring now to FIGS. 8A-10G, provided is a screw 50 and a base 52 having a housing with a first slot 54 and an oblong elongated second slot 55 offset from first slot 54 which are preferably connected to each other and are formed on opposite walls 71, 73 of base 52 to receive and retain first and second cable portions 56, 57 to the base (see FIGS. 9A-9E). A threaded portion 58 of the screw is larger in diameter and is located behind a tapered section 60 and between head 51 of the screw and portion 60 of the screw (See FIGS. 8A-8C).

Referring to FIGS. 10A-10G, during installation, the first cable portion 56 passes into the furthest upper vertical extremity or portion 53 of the slot 55 temporarily while the second cable portion 57 passes by the first cable portion 56 into its horizontal position in slot 54. Then, first cable portion 56 then drops into its horizontal position in lower portion 59 of slot 55 while the screw 50 is inserted into the base 52.

The taper portion 60 of the screw first passes between the parallel paths of the cable formed by slots 54, 55, then as the screws are tightened into the housing threaded section 75, screw 50 pushes the cable portions 56, 57 into the circular pockets of slots 54, 59 and clamps the cable to the housing. This configuration enables a larger screw to be utilized thus provides a stronger clamping force onto the cables and provides easier installation of the cables with the slots provided.

Referring to FIG. 3, as the screw is inserted and tightened into the housing the screw threaded portion 16 threads into threads 22 of the housing and tapered portion 18 engages tapered portion 21 of the housing, the screw pushes the cables (not shown) into the circular pockets formed by slots 14, 15 and clamps them to the housing. This configuration allows the cables to be easily installed into the slots of the base before the screw is installed.

Referring now to FIGS. 11A-14, a fourth embodiment of the disclosure includes a screw 100 and a base 102 having a housing with through-ports or pockets 104, 106 therein to receive a cable 110. A threaded portion 112 of the screw is larger in diameter and is located behind tapered section 114 of the screw and between head 116 of the screw and portion 114.

The cables 110 are inserted through the parallel ports 104, 106 of the base housing 102 after which the screw 100 is then installed. Port 104 includes a pair of openings 120, 122 aligned with each other and formed on opposite walls 124, 126 of base 102. Similarly, port 106 has a pair of openings 128, 130 aligned with each other and on opposite walls 124, 126 of the base housing. Openings 120, 122 are preferably parallel with each other and with openings 128, 130 which are also parallel to each other.

The taper portion 114 of the screw 100 first passes between parallel paths of the cable formed by ports 104, 106, then it is tightened into the base housing 102, pushing portions 132, 134 of cable 110 into the circular pockets formed by ports 104, 106 and clamping them to the housing 102 (see FIGS. 11A-11C and 14). The threaded portion 112 of the screw 100 engages threaded portion 140 of the base 102.

This embodiment enables a larger screw 100 to be utilized and the enclosed circular pockets 104, 106 within the base housing 102 thus provides a stronger clamping force onto the cable 110.

FIGS. 12A-12E illustrate a variation to the diameter 142 of base threaded portion 140 relative to the outer diameter 144 formed by circular pockets 104, 106 of the base. In this version of the base 102, the thread diameter 142 is larger than the outer diameter 144 formed by the circular pockets 104, 106 formed in recessed portion 105 positioned in front or below the base thread portion 140. In other embodiments, the base pockets had a larger overall diameter than the threaded portion of the base.

Figures 13A, 13B, 13C:
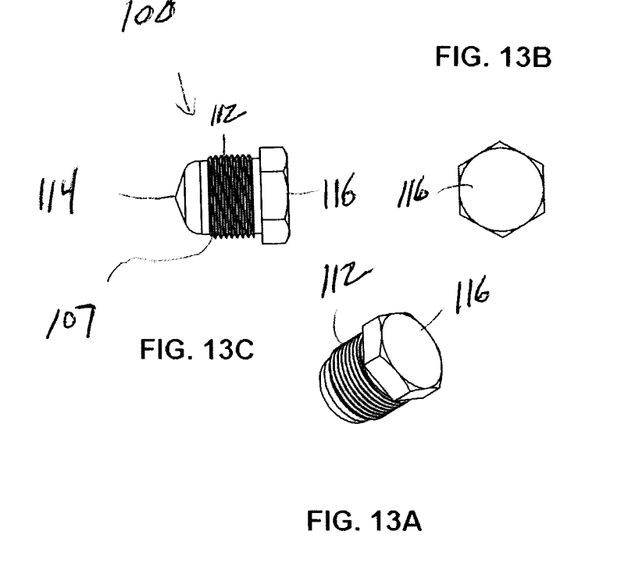
FIG. 13A is a perspective view of the screw of the base and screw assembly of FIG. 11A.
FIG. 13B is a top plan view of the screw of FIG. 13A.
FIG. 13C is a side elevational view of the screw of FIG. 13A.
Figure 14:
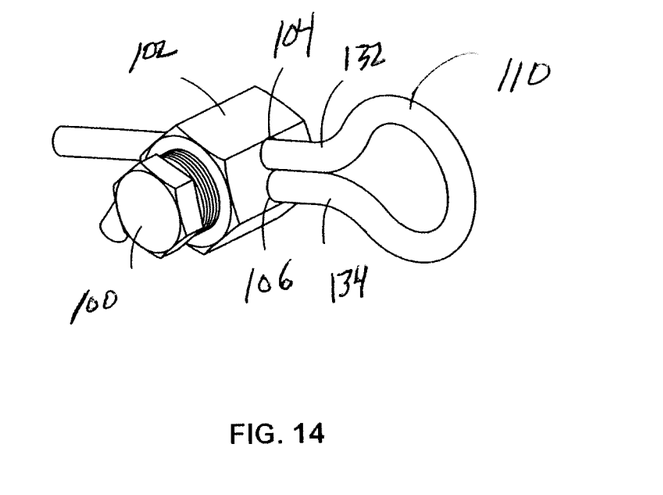
FIG. 14 is a perspective view of a cable installed in the base and screw assembly of FIGS. 11A-13C.

FIGS. 13A-13C illustrate the tapered screw 100 which has a relatively larger screw diameter 107 to match the base described above for FIGS. 12A-12E.

FIGS. 11A-11D illustrate the two parts (base 102 and screw 100) assembled.

The larger threaded portion 140 of the base 102 in this embodiment enables a much simpler machining operation to form the circular pockets 104, 106 of the base, since the pockets outer diameter 144 is smaller than the thread diameter 142 in the base allowing a simple smaller tool to machine the pocket (or recess area) to receive the cable portions during product use. The previous embodiment has a larger pocket diameter relative to the base thread diameter thus requires a special variable axis tool to pass by the base thread then cut a larger diameter pocket feature into the base.

Since the screw and base thread diameters are larger than the previous embodiment, the rope clamping force can be increased that acts to secure the rope within the connector assembly during installation.

The exemplary embodiments have been described with reference to the preferred embodiments. Obviously, modifications or alterations will occur to others upon reading and understanding the proceeding detailed description. It is intended that the exemplary embodiment and appended claims be construed as including all such modifications and alterations.

The invention claimed is:

1. A cable terminator connector comprising:
   a screw comprising a threaded portion and an unthreaded portion, wherein said threaded portion diameter is greater than a diameter of said unthreaded portion;
   a base comprising a housing with a recessed portion forming a first pair of openings and a second pair of openings formed on opposite side walls of said base;
   wherein said first and second openings are configured to receive first and second cable portions;
   wherein when said screw is threaded into said housing said first and second cable portions are pushed into pockets formed within the recessed portion of said housing by said unthreaded portion of said screw thereby clamping said first and second cables portions into said housing;
   wherein said screw comprises a head and said unthreaded portion comprises a tapered portion, and wherein said threaded portion extends between said head and said tapered portion;

wherein said base comprises a threaded portion positioned adjacent said first and second openings, wherein said threaded portion diameter is greater than an outer diameter of said recessed portion first and second pair of openings.

2. A cable terminator connector comprising:

a screw comprising a threaded portion and an unthreaded portion, wherein said threaded portion diameter is greater than a diameter of said unthreaded portion;

a base comprising a recessed portion having a first pair of openings and a second pair of openings formed on opposite side walls of said base and a threaded portion having a diameter greater than a diameter of the recessed portion;

wherein said first and second pair of openings are configured to receive first and second cable portions;

wherein when said screw is threaded into said threaded portion of said base, said first and second cable portions are pushed into pockets formed within the recessed portion of said base by said unthreaded portion of said screw thereby clamping said first and second cables portions into said base;

wherein said screw comprises a head and said unthreaded portion comprises a tapered portion, and wherein said threaded portion extends between said head and said tapered portion; and wherein said first and second pair of openings are parallel to each other.

3. A method of terminating cable comprising:

providing a screw having a threaded portion and a tapered portion having a smaller diameter than said threaded portion;

providing a base having a threaded portion and a recessed portion comprising a first pair of openings and a second pair of openings;

inserting first and second cable portions into said first and second pair of openings of said base;

threading said screw into a threaded portion of said base and moving said tapered portion into contact with said first and second cable portions thereby pushing said first and second cable portions into pockets formed in sidewalls of said base by said first and second pairs of openings thereby clamping said first and second cables portions into said base;

wherein said base threaded portion has a greater diameter than said recessed portion; and wherein said first and second pairs of openings of said base each includes a pair of openings formed on opposite side walls of said base.

\* \* \* \* \*